United States Patent
Balasubramanian et al.

(10) Patent No.: US 10,142,205 B2
(45) Date of Patent: Nov. 27, 2018

(54) SYSTEM AND METHOD FOR OPTIMIZING EVENT ALERTS IN AN INFORMATION TECHNOLOGY (IT) INFRASTRUCTURE MANAGEMENT SYSTEM

(71) Applicant: Wipro Limited, Bangalore (IN)

(72) Inventors: Ramkumar Balasubramanian, Bangalore (IN); Premchand Ryali, Bangalore (IN); Shivamurthy Harave Guruswamappa, Chamarajanagar (IN)

(73) Assignee: Wipro Limited, Bangalore (IN)

( * ) Notice: Subject to any disclaimer, the term of this patent is extended or adjusted under 35 U.S.C. 154(b) by 152 days.

(21) Appl. No.: 14/946,191

(22) Filed: Nov. 19, 2015

(65) Prior Publication Data
US 2017/0104652 A1  Apr. 13, 2017

(30) Foreign Application Priority Data
Oct. 7, 2015  (IN) .............. 5361/CHE/2015

(51) Int. Cl.
*H04L 12/26* (2006.01)
*H04L 12/24* (2006.01)

(52) U.S. Cl.
CPC ........ *H04L 43/0823* (2013.01); *H04L 41/065* (2013.01); *H04L 41/0631* (2013.01); *H04L 41/12* (2013.01); *H04L 43/16* (2013.01)

(58) Field of Classification Search
CPC ...... H04L 43/0823; H04L 43/16; H04L 41/12
See application file for complete search history.

(56) References Cited

U.S. PATENT DOCUMENTS

| | | | |
|---|---|---|---|
| 6,446,136 B1 | 9/2002 | Pohlmann et al. | |
| 7,076,695 B2 * | 7/2006 | McGee | G06F 11/0709 |
| | | | 702/179 |
| 7,251,584 B1 | 7/2007 | Perazolo et al. | |
| 7,890,329 B2 | 2/2011 | Wu et al. | |
| 8,464,279 B2 | 6/2013 | Gutjahr et al. | |
| 2008/0016412 A1 * | 1/2008 | White | G06F 11/3409 |
| | | | 714/48 |
| 2008/0155564 A1 | 6/2008 | Shcherbina et al. | |

(Continued)

FOREIGN PATENT DOCUMENTS

WO  2015048412 A1  4/2015

*Primary Examiner* — Oanh Duong
(74) *Attorney, Agent, or Firm* — LeClairRyan PLLC (57) ABSTRACT

System and method for optimizing event alerts in an information technology (IT) infrastructure management system are disclosed. In one embodiment, the method comprises tracking one or more event alerts triggered by monitoring tools. The method further comprises determining a probable usage for at least one configuration item associated with the one or more event alerts. The method further comprises determining a probable threshold value for each of the at least one configuration item based on the probable usage and capacity data. The method further comprises computing a final threshold value for each of the at least one configuration item based on the probable threshold value, seasonality data, or semantic context data. The method further comprises optimizing the event alerts by filtering at least one unwanted event alert from the one or more event alerts based on at least one of the final threshold value and filtering rules.

20 Claims, 3 Drawing Sheets

(56) References Cited

U.S. PATENT DOCUMENTS

| | | | |
|---|---|---|---|
| 2012/0166624 A1* | 6/2012 | Suit | G06F 9/5077 709/224 |
| 2012/0167084 A1* | 6/2012 | Suit | G06F 11/3495 718/1 |
| 2013/0179624 A1* | 7/2013 | Lambert | G06F 12/0246 711/103 |
| 2014/0277769 A1* | 9/2014 | Matsuoka | F24F 11/30 700/278 |
| 2015/0126234 A1* | 5/2015 | Rodriguez | G08B 13/22 455/457 |
| 2015/0293685 A1* | 10/2015 | Chen | G06F 3/04847 715/804 |
| 2015/0367770 A1* | 12/2015 | Newton-Dunn | B60Q 1/00 340/438 |
| 2017/0104652 A1* | 4/2017 | Balasubramanian | H04L 43/0823 |

\* cited by examiner

SYSTEM AND METHOD FOR OPTIMIZING EVENT ALERTS IN AN INFORMATION TECHNOLOGY (IT) INFRASTRUCTURE MANAGEMENT SYSTEM

This application claims the benefit of Indian Patent Application Serial No. 5361/CHE/2015 filed Oct. 7, 2015, which is hereby incorporated by reference in its entirety.

TECHNICAL FIELD

This disclosure relates generally to information technology (IT) infrastructure management system and more particularly to a system and a method for optimizing event alerts in an IT infrastructure management system.

BACKGROUND

Recently, large and complex IT (Information Technology) infrastructures have evolved to meet the enormous and varying demands of industries and organizations. Any business in any industry like, IT and Banking services, Healthcare, Financial Services, Insurance, Pharmaceuticals, Media, and Telecom now deploy heavy IT infrastructure to support and run their businesses smoothly and efficiently. An IT infrastructure may be defined as a combined set of IT related components, such as hardware, software, and networks. This combined set of IT components helps in performing various operations to provide IT services. To identify issues/errors in functioning of the IT infrastructure, IT infrastructure management systems comprising various monitoring tools are used. The monitoring tools are designed and developed to monitor and/or identify any anomaly or malfunctioning in these components so that they can be resolved quickly and reactively. The anomaly/malfunctioning in the IT infrastructure is reported to a ticketing tool by the IT infrastructure management system.

However, despite all such kind of advancements, support teams may not be able to provide timely and accurate resolutions for errors/problems occurring in the IT infrastructure management system. As per the industry, it has been observed that such delays occur due to many reasons, among which few being the sheer load of unwanted and/or redundant alerts/tickets that get logged by the monitoring tools require attention of the support team to resolve them quickly. Hence, the technical support team faces the barrage of unwanted alerts to resolve and thereby wasting resources and time in resolving unwanted alerts. Further, critical alerts may not get the much needed time and resources from the support team which in turn may affect overall efficiency of the IT infrastructure management system.

SUMMARY

In one embodiment, a method for optimizing event alerts in an IT infrastructure management system is disclosed. The method comprises tracking one or more event alerts, triggered by monitoring tools, in the IT infrastructure management system. The method further comprises determining a probable usage for at least one configuration item associated with the one or more event alerts based on the tracking. The method further comprises determining a probable threshold value for each of the at least one configuration item based on the probable usage and capacity data. The method further comprises computing a final threshold value for each of the at least one configuration item based on at least one of the probable threshold value, seasonality data, or semantic context data. The method further comprises optimizing the event alerts by filtering at least one unwanted event alert from the one or more event alerts based on the final threshold value.

In another embodiment, a system for optimizing event alerts in an IT infrastructure management system is disclosed. The system includes at least one processors and a computer-readable medium. The computer-readable medium stores instructions that, when executed by the at least one processor, cause the at least one processor to perform operations comprise tracking one or more event alerts, triggered by monitoring tools, in the IT infrastructure management system. The operations further comprise determining a probable usage for at least one configuration item associated with the one or more event alerts based on the tracking. The operations further comprise determining a probable threshold value for each of the at least one configuration item based on the probable usage and capacity data. The operations further comprise computing a final threshold value for each of the at least one configuration item based on at least one of the probable threshold value, seasonality data, or semantic context data. The operations further comprise optimizing the event alerts by filtering at least one unwanted event alert from the one or more event alerts based on the final threshold value.

In another embodiment, a non-transitory computer-readable storage medium for optimizing event alerts in an IT infrastructure management system is disclosed, which when executed by a computing device, cause the computing device to perform operations comprise tracking one or more event alerts, triggered by monitoring tools, in the IT infrastructure management system. The operations further comprise determining a probable usage for at least one configuration item associated with the one or more event alerts based on the tracking. The operations further comprise determining a probable threshold value for each of the at least one configuration item based on the probable usage and capacity data. The operations further comprise computing a final threshold value for each of the at least one configuration item based on at least one of the probable threshold value, seasonality data, or semantic context data. The operations further comprise optimizing the event alerts by filtering at least one unwanted event alert from the one or more event alerts based on the final threshold value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

In an IT infrastructure management system, monitoring tools monitor operations, performed by components of the IT infrastructure, to identify issues/anomaly associated with the operation and/or the components. In the IT infrastructure, the components may be devices, combination of devices, and application software and may also be referred to as configuration items. The issues are also referred to as events in the IT infrastructure. In an example, the events may be broadly classified into three categories: events related to capacity of infrastructures, such as memory utilization and CPU utilization; events related to software/applications infrastructures, such as auto system scheduler issue, database refresh failed, and long running query issue; and events related to hardware faults, such as port Issue and local area network (LAN) Issue. When an event is identified, the monitoring tools may generate an event alert to indicate the occurrence of the event to an IT management service (ITSM) for resolving the issue/anomaly that caused the event. It may be noted that, the event alert may also be interchangeably referred to as an event alarm, an event notification, and an event signal in the IT infrastructure system.

The present subject matter discloses systems and methods for optimizing event alerts in an IT infrastructure management system. The systems and methods optimize the event alerts by eliminating unwanted alerts generated by monitoring tools. The present subject matter employs a new dynamic threshold value to filter out the unwanted alerts from the event alerts generated by the monitoring tools. Further, the present subject employs new filtering rules to filter out the unwanted alerts, that weren't filtered after the first filtering. Thus, the present subject matter performs two levels of optimization to filter out the unwanted alerts generated by the monitoring tools.

The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Figure 1:
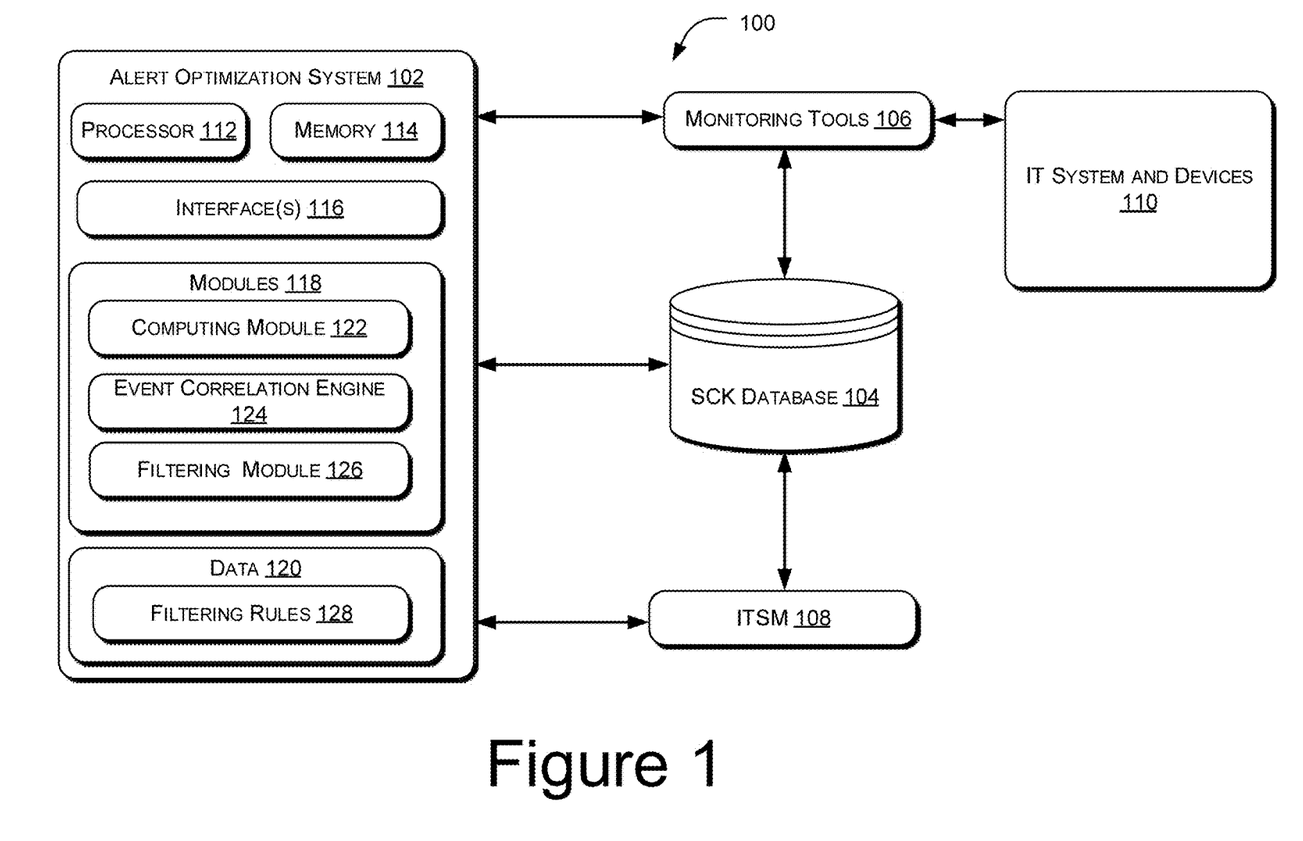
FIG. 1 illustrates an exemplary network implementation comprising an alert optimization system, in accordance with some embodiments of the present disclosure.
Figure 2:
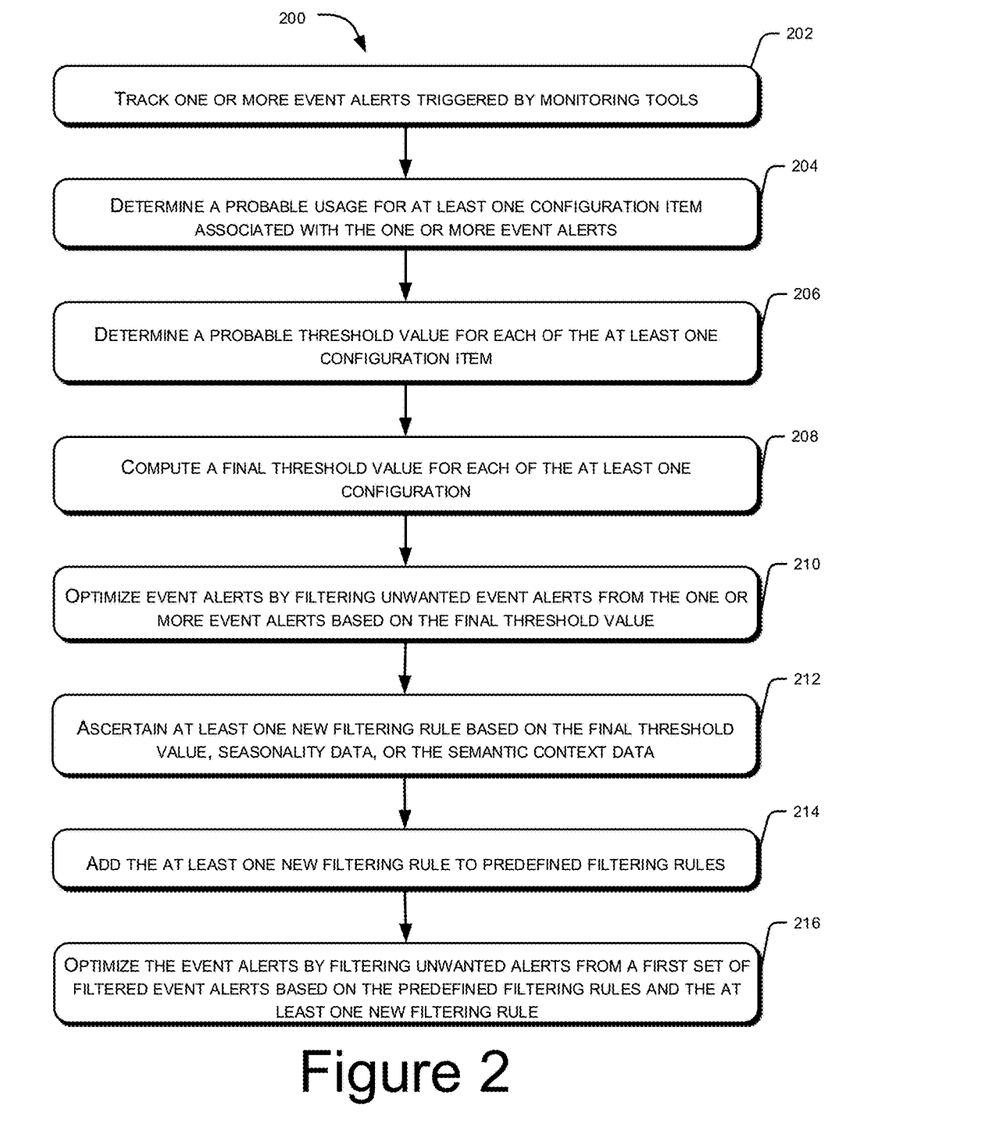
FIG. 2 illustrates an exemplary method for optimizing event alerts in an IT infrastructure management system, in accordance with some embodiments of the present disclosure.
Figure 3:
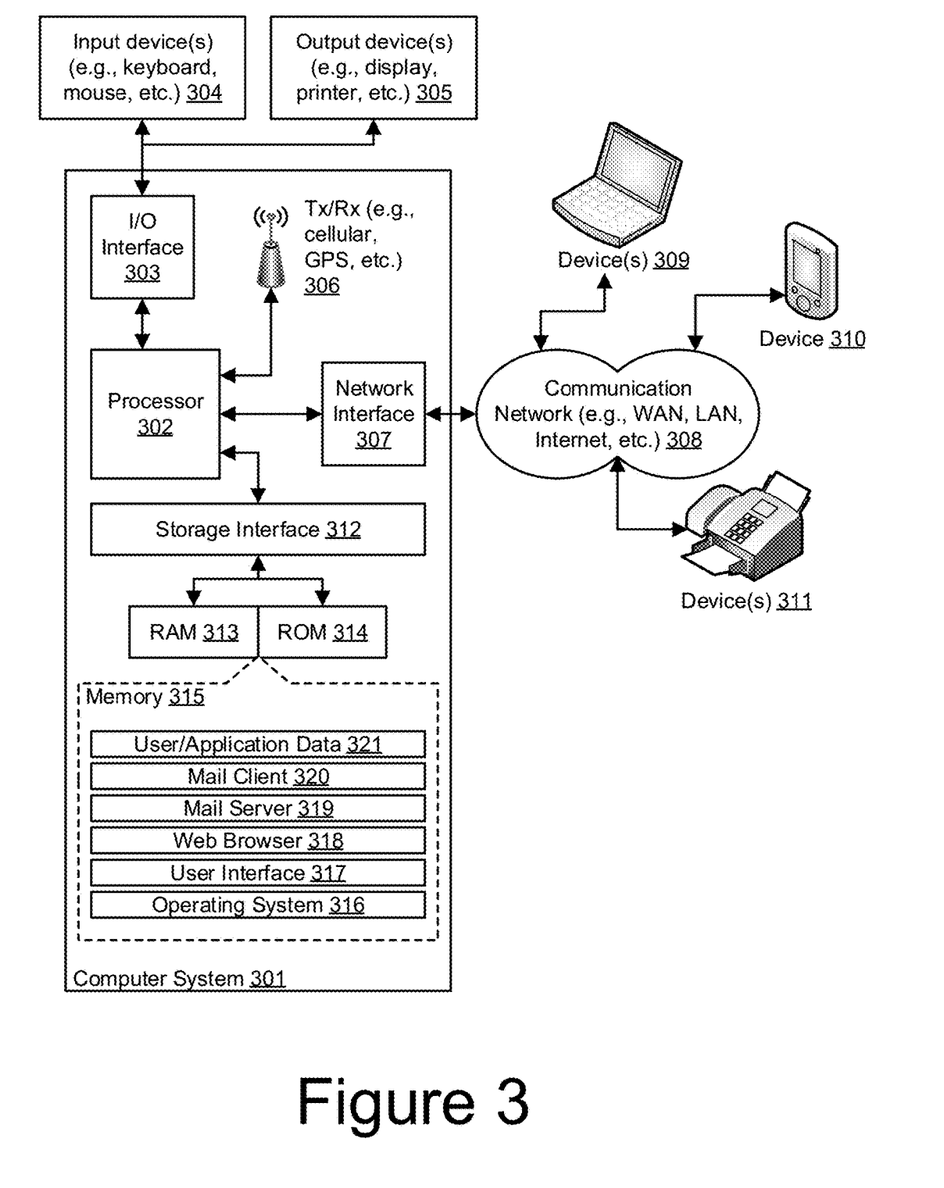
FIG. 3 is a block diagram of an exemplary computer system for implementing embodiments consistent with the present disclosure.

Working of the systems and methods for optimizing event alerts in an IT infrastructure management system is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network environment 100 comprising an alert optimization system 102, in accordance with some embodiments of the present disclosure. As shown in FIG. 1, the alert optimization system 102 is communicatively coupled to a semantic and contextual knowledge (SCK) database 104, monitoring tools 106 and an Information Technology Service Management (ITSM) 108. Although the SCK database 104 is shown external to the alert optimization system 102 in FIG. 1, it may be noted that, in one implementation, the SCK database 104 may be present within the alert optimization system 102. Hereinafter, the alert optimization system 102 may be interchangeably referred to as system 102.

The system 102 may be implemented on variety of computing systems. Examples of the computing systems may include a laptop computer, a desktop computer, a tablet, a notebook, a workstation, a mainframe computer, a server, a network server, and the like.

The SCK database 104 may comprise events and reasons that caused the events, semantic context data pertaining to the events, seasonality data, capacity data, one or more predefined rules to generate event alerts, and patterns obtained from raw data pertaining to the IT infrastructure management system. In an example, the SCK database 104 may be created by natural language processing (NLP) techniques to aggregate the events, the seasonality data, the capacity data, the semantic context data, the one or more predefined rules for generating the event alerts and the patterns obtained from raw data pertaining to the IT infrastructure management system.

The seasonality data may indicate seasonal behavior of the event alerts. In an example, the seasonality data may comprises static seasonality and dynamic seasonality associated with the event alerts reported by the monitoring tools 106. The static seasonality may indicate event alerts that occur frequently because of known reasons with respect to known interval of time. For example, usage of an automated teller machine (ATM) is generally high usage during first week of the month. This indicates static seasonal behavior of an event alert, which is high usage of the ATM machine.

The capacity data may comprise capacity of components, such as hardware and applications that are present in the IT infrastructure and how the capacity of a particular component may trigger an event alert. For example, task of an ATM is to provide a money to customers. Performance of the ATM typically depends on components of an associated server, such as memory, central processing unit (CPU), and operating system (OS). Limited memory or processing requirement of the components may cause an event in the IT infrastructure.

Further, the semantic context data may comprise patterns generated based on the events reported and the data associated with functioning of the devices and software in the IT infrastructure.

The monitoring tools 106 monitor behavior of IT system and devices 110 in the IT infrastructure with respect to predefined threshold values and rules. In an example, monitoring tools 106 such as, Wipro Viking™, HP open view™, and IBM Tivoli™ may be used for monitoring the IT system and devices 110. Further, the IT system and devices 110 may be a collection of hardware, software and network to support the services provided by the IT infrastructure. The hardware may include, but not limited to, servers, switches, and adopters. The software may include, but not limited to, operating systems (OS) and applications. It may be noted that the IT system and devices 110 may be interchangeably referred to as configuration items or components hereinafter.

The ITSM 108 is a service level ticket management tool. The ITSM 108 typically processes event alerts reported by the monitoring tools 106 for timely resolution. The ITSM 108 may comprise Information Technology Infrastructure Library (ITIL) to resolve the tickets/events reported by the monitoring tools 106. In an example, eHelpline™ or, Remedy™ may be used the ITSM 108.

The system 102 may be communicatively coupled to the SCK database 104, the monitoring tools 106, and the ITSM 108 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in FIG. 1, the system 102 comprises a processor 112, a memory 114 coupled to the processor 112, and interface(s) 116. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor 112 is configured to fetch and execute computer-readable instructions stored in the memory 114. The memory 114 can include any non-transitory computer-readable medium known in the art including, for example, volatile memory (e.g., RAM), and/or non-volatile memory (e.g., EPROM, flash memory, etc.).

The interface(s) 116 may include a variety of software and hardware interfaces, for example, a web interface, a graphical user interface, etc., allowing the system 102 to interact with user devices, the monitoring tools 106, the SCK database 104, and the ITSM 108. Further, the interface(s) 116 may enable the system 102 respectively to communicate with other computing devices. The interface(s) 116 can facilitate multiple communications within a wide variety of networks and protocol types, including wired networks, for example LAN, cable, etc., and wireless networks such as WLAN, cellular, or satellite. The interface(s) 116 may include one or more ports for connecting a number of devices to each other or to another server.

In one example, the system 102 includes modules 118 and data 120. In one embodiment, the modules 118 and the data 120 may be stored within the memory 114. In one example, the modules 118, amongst other things, include routines, programs, objects, components, and data structures, which perform particular tasks or implement particular abstract data types. The modules 118 and may also be implemented as, signal processor(s), state machine(s), logic circuitries, and/or any other device or component that manipulate signals based on operational instructions. Further, the modules 118 can be implemented by one or more hardware components, by computer-readable instructions executed by a processing unit, or by a combination thereof.

In one implementation, the modules 118 further include a computing module 122, an event correlation engine 124, and a filtering module 126. In an example, the modules 118 may also comprises other modules. The other modules may perform various miscellaneous functionalities of the system 102. It will be appreciated that such aforementioned modules may be represented as a single module or a combination of different modules.

In one example, the data 120 serves, amongst other things, as a repository for storing data fetched, processed, received and generated by one or more of the modules 118. In one implementation, the data 120 may include filtering rules 128. In one embodiment, the data 120 may be stored in the memory 114 in the form of various data structures. Additionally, the aforementioned data can be organized using data models, such as relational or hierarchical data models. In an example, the data 120 may also comprises other data used to store data, including temporary data and temporary files, generated by the modules 118 for performing the various functions of the system 102.

In operations, to optimize one or more event alerts in the IT infrastructure management system, the computing module 122 may track the one or more event alerts generated by the monitoring tools 106. In the IT infrastructure management system, the events alerts may be understood as alerts/notifications/alarms reported by the monitoring tools 106 for the issues/errors that may arise in the IT infrastructure while providing services to organizations.

The monitoring tools 106 monitors operations performed operations performed by configuration items in the IT infrastructure. Whenever, an issue/anomaly is detected by the monitoring tools 106 in the process and/or the configuration item, the monitor tools may trigger an event alert to report the issue. The computing module 122 may track the one or more event alerts triggered by the monitoring tool.

Once the event alerts are detected, the computing module 122 may then identify the configuration items associated with the event alert. Thereafter, the computing module 122 may determine a probable usage for each of the configuration items. The probable usage of a configuration item may indicate usage limit of the configuration for a particular seasonality.

In one implementation, a time interval may also be associated with the probable usage computed for the configuration item. For example, for a server A, the probable usage may be 75% for a time interval of 5 mins. In another example, for an application A, the probable usage may be 70% for a time interval of 3 mins. This indicates, usage of the configuration item, i.e., the application A is expected be 70% for 3 mins.

Further, the computing module 122 may compute the probable usage based on at least one of contextual usage of the configuration item, seasonality with respect to each of the configuration items, down-time data of each of the configuration items, also referred to as a green zone: planed down time. The computing module 122 may retrieve the seasonality and semantic context data for each of the configuration items, associated with the event alerts, from the SCK database 104. Subsequently, the computing module 122 may classify various seasons, determined based on the seasonality data, with respect to usage of the configuration items. Thereafter, the computing module 122 may map the seasons to each of the configuration items.

Further, computation of the probable usage is explained with the help of equations below. In an example, relation between the probable usage of the configuration item (CI) and the seasons may be specified by Equation 1.

$$\text{Probable Usage(CI)}=\text{season's(CI)} \quad \text{Equation 1}$$

Similarly, the probable usage for each of the configuration item is computed by the computing module 122. In an example, if the event alert is associated with one configuration item, the probable threshold value may be calculated based on the probable usage of the configuration item. In another example, if the event alert is associated with more than one configuration item, a percentage of participation for each of the configuration items may be calculated to determine probable threshold value. To calculate the percentage of participation, the probable usage associated with each of the configuration items may be added to obtain a probable total usage, as given in Equation 2.

$$\text{Probable Total Usage}=\text{Probable Usage(CI1)}+\text{Probable Usage(CI2)} \ldots + \ldots \text{Probable Usage(CI}n) \quad \text{Equation 2}$$

The computing module 122 may then compute the Percentage of participation (PP) for each of the configuration items with respect to a master server using equation 3.

$$PP1=\text{Probable Usage(CI1)}*100/\text{Probable Total Usage} \quad \text{Equation 3}$$

Thereafter, the computing module 122 may compute the probable threshold value for each of the configuration items based on the percentage of participation for each of the configuration items. The probable threshold value is directly proportional to the percentage of participation for each of the configuration items as given in Equation 4.

$$\text{Probable threshold value} \propto PP1, PP2, \ldots PPn \quad \text{Equation 4}$$

Further, since the probable threshold value is proportional to the percentage of participation, the probable threshold value may be determined based on the probable usage and the percentage of participation. Further, where only one configuration item is associated with the event alert, the probable threshold value may be considered equal to the probable usage of the configuration item, as given in Equation 5.

$$\text{Probable threshold value(PT)}=(\text{Probable Usage}) \quad \text{Equation 5}$$

Further, a feasible range for the probable threshold value may be computed by the computing module 122 using Equation 6.

$$\text{Feasible range}=(\text{Maximum capacity})-(\text{Capacity for background program}) \quad \text{Equation 6}$$

Where capacity may be a storage capacity of a memory or processing capacity of a Central Processing Unit (CPU), determined based on the event context. The computing module 122 may extract the maximum capacity and the capacity for background program from the capacity data obtained from the SCK database 104.

Further, the computing module 122 may determine the time interval to be associated with the probable threshold value based on the number of event alerts generated in the past for a particular configuration item. In an example, the time interval is inversely proportional to the number of event alerts, as given in Equation 7.

$$\text{Time Interval}(I)=1/\text{Number of Event Alerts} \quad \text{Equation 7}$$

Upon determining, the probable threshold value and the time interval, the computing module 122 may determine a final threshold value for each of the configuration item based on the semantic context data, the seasonality data and the probable threshold value.

In an example, the computing module 122 may determine whether the probable threshold value is in a predefined feasibility range or not and conclude the final threshold value accordingly. Further, the time interval may also be updated by the computing module 122 based on the probable threshold value. The computing module 122 may determine the final threshold value and the time interval based on relations expressed below in Equation 8.

$$\text{Equation 8}$$
$$f(PT) = \begin{cases} FT = PT, TI = TI + e, & \text{if } PT \text{ is in feasible range} \\ FT = FT, TI = TI, & \text{if } PT \text{ is not in feasible range} \end{cases}$$

Where FT is the final threshold value, PT is the probable threshold value, TI is the time interval, and e is the increasing factor. In an example, the increasing factor may be set to predefined value determined based on at least one of a user input and the semantic context data.

Once the final threshold value is determined, the filtering module 126 may filter out unwanted event alerts from the one or more event alerts based on the final threshold value. The unwanted event alerts, eliminated by the filtering module 126, are not reported to the ITSM 108. In an example, the final threshold value is dynamically determined and the time interval is determined for the final threshold value based on the probable threshold value and the season associated with the configuration item. Further, based on the final threshold value and the time interval, the unwanted event alerts are eliminated from the one or more event alerts. Upon the filtering/eliminating the unwanted event alerts, a first set of filtered event alerts are obtained. In this manner, a first level of optimization is performed by eliminating the unwanted event alerts from the one or more event alerts triggered by the monitoring tools 106.

Table 1 below provides some exemplary unwanted event alerts that are triggered by the monitoring tools 106 and may be filtered out by the filtering module 126 of the system 102. The table 1 provides the event alerts generated along with the name and/or address of the configuration item (CI) associated with the event alert. The table 1 also provides threshold value and the current value for the exemplary unwanted event alerts.

TABLE 1

| S. No | Unwanted Event Alert(s) | Existing Threshold value (%) | Current Value (%) |
|---|---|---|---|
| 1 | Host1-Memory Utilization crossed the threshold value | 80 | 85.03 |
| 2 | Memory utilization value exceeds the threshold value @,@backupserver.xxxx.com@,@server@,@warning | 75 | 81.92 |
| 3 | Host2-Memory Utilization crossed the threshold value, CI's IP Address::x.x.x.x | 75 | 80.63 |
| 4 | Host3-Memory Utilization crossed the threshold value | 75 | 75.25 |
| 5 | Memory Monitoring on Host4 exceeds the threshold value | 80 | 81.87 |
| 6 | Host4-Memory Utilization crossed the threshold value | 80 | 84.98 |
| 7 | Host5-Memory Utilization crossed the threshold value, CI's IP Address::xxxxxxxx123 | 75 | 80.65 |
| 8 | Host6-Memory Utilization crossed the threshold value | 75 | 78.74 |
| 9 | Host7-Memory Utilization crossed the threshold value, CI's IP Address::xxxxxxx678 | 85 | 85.60 |
| 10 | Memory-Memory Utilization crossed the threshold value, CI's IP Address::xxxxxxxx1828 | 75 | 75.29 |
| 11 | Memory utilization value exceeds the threshold value, CI's IP Address::xxxxxxxx72773 | 85 | 88.51 |
| 12 | Memory Monitoring ("Memory Utilization value greater than or equal to the threshold value | 80 | 84.25 |
| 13 | Host12-Disk Space E:\ Utilization crossed the Threshold Limit :80 Current Value: 85.66 | 80 | 85.66 |
| 14 | xxxxxxxxxxxxx-Memory Utilization crossed the threshold value, CI's IPAddress::xxxxxxxx123 | 75 | 75.11 |
| 15 | Host8-Memory Utilization crossed the Threshold value | 80 | 85.27 |
| 16 | Host9-Memory Utilization crossed the threshold value, CI's IP Address::xxxxxxxx123 | 75 | 75.23 |
| 17 | Host10-Memory Utilization crossed the threshold value | 75 | 79.24 |
| 18 | Memory Utilization crosses the threshold value Top 3 Processes:-sqlservr.exe - 59.274%;SemSvc.exe - 4.225%;java.exe - 1.939% | 80 | 82 |
| 19 | Host11-Memory Utilization crossed the threshold value, CI's IP Address::xxxxxxxx789 | 75 | 80.87 |
| 20 | Host12-Memory Utilization crossed the threshold value | 80 | 85.38 |

In an example, in the table 1, the unwanted event alerts 1, 2, 3, 4, and 5 may belong to a season 1 and a context 1. Further, maximum usage during the season 1 for the CI corresponding to respective event alerts may be the following: maximum usage of CI-1=89%, maximum usage of CI-2=90%, maximum usage of CI-3=85%, maximum usage of CI-4=83%, and maximum usage of CI-5=86%.

Similarly, the unwanted event alerts 6, 7, 8, 9, 10, 11, and 12 may belong to a season 2 and a context 2. Further maximum usage during season 2 for the corresponding CIs may be the following: maximum usage of CI-6=93%, maximum usage of CI-7=90%, maximum usage of CI-8=85%, maximum usage of CI-9=89% . . . , and maximum usage of CI-12=91%.

Similarly, the unwanted event alerts 13, 14, 15, 16, 17, and 18 may belong to a season 3 and a context 3. Further, maximum usage for the corresponding CI's may be the following: maximum usage of CI-13=93%, maximum usage of CI-14=90%, maximum usage of CI-15=85%, maximum usage of CI-16=83% . . . , and maximum usage of CI-18=91%.

Similarly, the unwanted event alerts 19 and 20i may belong to a season 4 and a context 4. Further, maximum usage of the corresponding CI's during the season 4 may be the following: maximum usage of CI-19=93% and maximum usage of CI-20=90%.

Whenever, a new event alerts, which is exactly same as one of the unwanted event alerts in the table 1, the season and the context is determined based on the unwanted event alert entries in the table 1. In an example, if the new event alert is same as the unwanted event alert 1, it may be determined that the new event alert belongs to the season 1 and the context 1. Similarly, the maximum usage may be extracted by comparing the new event alert against the unwanted event alert 1. In said example, maximum usage of the CI-1 associated with the unwanted event alert 1 is 89%. The maximum usage may be then considered as the probable usage for calculating the probable threshold value, as given in Equation 9.

$$\text{Probable threshold}(PT) = (\text{Probable Usage}) = 89\% \quad \text{Equation 9}$$

Thereafter, the predefined feasible range is determined based on the maximum available capacity and the capacity for background program, as given in Equation 6. In said example, the feasible range is 94% (=98%–4%). Since the probable threshold value is within the feasible range (94%>89%), 89% may be set as the final threshold value till the end of season 1. In this manner, the unwanted event alert 1, having the current value of 85.03%, may be filtered/eliminated by the filtering module 126 as the current value is less than the final threshold.

Upon first level of filtering the unwanted event alerts, the first set of filtered event alerts may be provided to the event correlation engine 124.

These filtered alerts are further forwarded to the event correlation engine 124. The event correlation comprises predefined filtering rules to eliminate/filter unwanted event alerts that passed through first level of optimization and are present in the first set of filtered event alerts. In an example, the predefined rules may be predefined in the event correlation engine 124 based on historical data pertaining to previously generated event alerts.

The correlation engine may determine at least one new filtering rule based on at least one of the semantic context data, the seasonality data, or the capacity data present in the SCK database 104. In an example, for a season1, configuration item (CI)=X, and a context=xyz, the event correlation engine 124 may determine a rule set 1 of new filtering rules: Rule set 1={rule1, rule2 rule3 rule4 . . . rulen}

Similarly, for other seasons, configuration items, and context, the new filtering rules may be determined. Thereafter, the intersection of the predefined rules and the new filtering rules may be performed so that redundant filtering rules are not present in the event correlation engine 124. Thereafter, the new filtering rules may be added to the event correlation engine 124. In an example, the event correlation engine may store the new filtering rules in the filtering rules 128.

Upon addition of the new filtering rules to the event correlation engine 124, the filtering module 126 may now perform a second level of optimization and may remove unwanted event alerts from the first set of event alerts obtained after first level of optimization. The second level of optimization is performed based on the predefined filtering rules and the new filtering rules. In this manner, the unwanted event alerts, that were not eliminated/filtered after the first level of optimization based on the final threshold, are filtered/eliminated from the first set of the event alerts. Thereby, obtaining final set of event alerts to be reported to the ITSM 108. In an example, once a season is over, the new filtering rules corresponding to that particular season may be deactivated in the event correlation engine 124.

With the new filtering rules, the unwanted event alerts associated with abnormal behavior of the configuration items are filtered or eliminated. In an example, where event alerts: Alert-A, Alert-B, Alert-C, Alert-D, Alert-E, and Alert-F are provided to the event correlation engine 124.

The event Alert-A may be suppressed by a rule-abc predefined in the event correlation engine 124. Similarly, the event Alert-B may be suppressed by a rule-xyz predefined in the event correlation engine 124. The event Alert-C is a valid alert. The event Alert-D may be suppressed by a rule-pqr predefined in the event correlation engine 124. Further, the event Alert-E and the event Alert-F are valid alerts.

However, post examination of the event alerts: Alert-C, Alert-E, and Alert-F, it is identified that the Alert-E and Alert-F are not valid alerts. If the Alert-E and the Alert-F are being continuously identified as the unwanted event alerts for a particular season and context, the correlation engine may determine a new filtering rule to filter the Alert-E and the Alert-F from the event alerts. In an example, the filtering rule may specify number of occurrence of the event alert, season and the context to filter the unwanted event alerts. Thus, the second level of optimization is performed by eliminating the unwanted event alerts present the first set of filtered event alerts. Further, the final threshold, the new filtering rules, and the optimized event alerts may be updated in the SCK database 104 for further reference and/or operations.

The filtering module 126 may then provide the final set of filtered event alerts to the ITSM 108 for resolving. The final set of filtered event alerts will be free from the unwanted event alerts eliminated/filtered from the first and second level of optimization.

In an example of an IT infrastructure, when a server takes a back-up of files present, the processor of the server may see a spike in the usage for a short interval of time, which may increase the probable usage above a threshold value. Then, the monitoring tools 106 may generate an event alert even if the spike in usage of the processor is expected. In such cases, the system 102 may determine the season and identify that the spike is usage is for a short interval of time. Based on the context, the probable usage and the season, the system 102 may determine a final threshold value for eliminating corresponding the event alert. Further, in case, the probable usage is within the final threshold value and have been reported more than a predefined number of times and post-validation it is identified that it is not a valid alert, a new rule may be specified indicating the event alert, the season and the context so that it doesn't get reported to the ITSM 108.

FIG. 2 illustrates an exemplary method for optimizing event alerts an IT infrastructure management system, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to FIG. 2, at block 202, one or more event alerts are tracked. In an example, the one or more event alerts are triggered by the monitoring tools 106 present in the IT infrastructure management system. The computing module 122 may track the one or more event alerts and identify the configuration items associated with each of the one or more event alerts. The configuration items may be understood as hardware and software, in an IT infrastructure, taking part in providing the IT services to an organization.

At block 204, a probable usage may be determined for at least one configuration item associated with the one or more event alerts. In an example, the computing module 122 may extract the probable usage for each of the configuration items from the SCK database 104. The probable usage may indicate an average usage limit of the configuration item in a particular season. The season associated with the event alert may be determined based on the seasonality data. In an example, the seasonality data, the semantic and context data, and down-time data associated with the configuration item are considered for computing the probable usage. Further, the computing module 122 may compute a percentage of participation for each of the configuration item. The percentage of participation may help in determining the probable threshold value.

At block 206, the probable threshold value for each of the at least one configuration item is computed based on the probable usage and capacity data. In an example, the computing module 122 may compute the probable threshold value for each of the configuration items associated with the one or more event alerts based on the probable threshold value and the capacity data. The capacity data may be obtained from the SCK database 104. The capacity data may indicate memory capabilities and/or processing capabilities of the configuration items.

Further, the computing module 122 may also determine a time interval to be associated with the probable threshold value. The time interval may be determined based on a season associated with the configuration item.

At block 208, a final threshold value is computed for each of the at least one configuration item based on at least one of the probable threshold value, the seasonality data, or the semantic context data. In an example, the computing module 122 may compute the final threshold value based on the probable threshold value and the seasonality data. To determine the final threshold value, the computing module 122 may check whether the probable threshold value is in a predefined feasible range or not. Then, depending upon the probable threshold value, the final threshold and the time interval is calculated.

At block 210, the event alerts are optimized by filtering at least one unwanted event alert from the one or more event alerts based on the final threshold value. In an example, the filtering module 126 may check whether current value of the configuration item exceeds the final threshold or not. In case, the current value is within the final threshold for a particular season, the filter module may eliminate the event alert corresponding to that particular configuration item as it was an unwanted event alert. Similarly, the current value of other configuration items may be compared with the final threshold to filter the unwanted event alerts from the one or more alerts. In this manner, optimization of the event alerts is performed. This optimization based on the final threshold is also referred to as a first level of optimization/filtering. Further, the event alerts obtained after the first level of optimization are referred to as a first set of filtered event alerts.

At block 212, at least one new filtering rule is ascertained based on at least one of the final threshold value, the seasonality data, or the semantic context data. In an example, the event correlation engine 124 may analyze the seasonality data, the semantic context data, and occurrence of the event alerts to derive the new filtering rules. The new filtering rule may specify a predefined number of occurrence of an event alerts, seasonality, and context to eliminate the unwanted event alerts that are repeated raised and tagged as invalid alert post validation.

At block 214, the at least one new filtering rule are added to the event correlation engine 124. In an example, the new filtering rules are stored along with the predefined filtering rules in the event correlation engine 124. Further, it may be noted that the new filtering rules are defined for a particular season and context. The new filtering rules may go in an inactive state once the season for the new filtering rules is over. The new filtering rules may become active again in the event correlation engine 124 upon identifying the event alerts corresponding to the season for which they are defined. In one implementation, where no new filtering rules are added to the event correlation engine 124, the event alerts may be optimized based on the predefined filtering rules present in the event correlation engine 124.

At block 216, the event alerts are optimized by filtering at least one unwanted event alert from the first set of filtered event alerts based on at least one of the predefined filtering rules and the at least one new filtering rule. In example, the filtering module 126 may filter the unwanted events based on the predefined filtering rules and the new filtering rules present in the event correlation engine 124. In this manner, a second level of optimization is performed and the unwanted event alerts that were not eliminated by the first level of optimized are filtered out from the first set of filtered event alerts. The event alerts obtained after the first level of optimization and the second level of optimization may be referred to as a final set of filtered event alerts. Upon obtaining the final set of filtered event alerts, the filtering module 126 may provide the final set of filtered event alerts to the ITSM 108 for resolving. In an example, the optimized event alerts, the final threshold value, and the new filtering rules may be updated in the SCK database 104 for future usage.

Thus, the present subject matter discloses a two-level optimization of the event alerts. The system 102 and the method disclosed herein eliminate/filter the unwanted event alerts. The unwanted alerts are eliminated based on the final threshold and the new filtering rules to achieve two levels of optimization. The present subject matter increase the efficiency of the IT infrastructure management system by eliminating the unwanted event alerts generated by the monitoring tools 106. With the present subject matter, the event alerts that are valid will be reported to the ITSM 108 for resolving.

Computer System

FIG. 3 is a block diagram of an exemplary computer system for implementing embodiments consistent with the present disclosure. Variations of computer system 301 may be used for implementing the computing module 122, the event correlation engine 124, and the filtering module 126 presented in this disclosure. Computer system 301 may comprise a central processing unit ("CPU" or "processor") 302. Processor 302 may comprise at least one data processor for executing program components for executing user- or system-generated requests. A user may be a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods optimizing event alerts in an IT infrastructure management system. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for optimizing event alerts in an information technology (IT) infrastructure management system, comprising:
    tracking, by a processor of an alert optimization system, one or more event alerts, triggered by monitoring tools, in the IT infrastructure management system;
    determining, by the processor, a probable usage for at least one configuration item associated with the one or more event alerts based on the tracking;
    determining, by the processor, a probable threshold value for each of the at least one configuration item based on the probable usage and capacity data;
    creating, by the processor, a mapping of at least one season to each of the at least one configuration item;
    computing, by the processor, a final threshold value for each of the at least one configuration item based on the probable threshold value, seasonality data, the mapping of the at least one season to each of the at least one configuration item, and semantic context data, wherein the final threshold value for each of the at least one configuration item is within a predefined feasibility range for the probable threshold value determined for each of the at least one configuration item, and wherein the predefined feasibility range associated with each of the at least one configuration item is determined based on maximum processing capacity and processing capacity currently utilized by a background program for an associated configuration item from the at least one configuration item;
    determining, by the processor, a time interval based on the number of event alerts generated in the past for the at least one configuration item, wherein the time interval is associated with the final threshold value based on the probable threshold value and the seasonality data; and
    optimizing, by the processor, the event alerts by filtering at least one unwanted event alert from the one or more event alerts based on the final threshold value and the time interval.

2. The method as claimed in claim 1, further comprises:
    dynamically ascertaining at least one new filtering rule based on at least one of the final threshold value, seasonality data, or the semantic context data;
    adding the at least one new filtering rule to an event correlation engine of the alert optimization system, wherein the event correlation engine comprises predefined filtering rules; and
    optimizing, by the event correlation engine, the event alerts by filtering at least one unwanted event alert from a first set of filtered event alerts, based on at least one of the predefined filtering rules and the at least one new filtering rule, wherein the first set of filtered event alerts is obtained upon filtering based on the final threshold value.

3. The method as claimed in claim 2 further comprises reporting optimized event alerts to an information technology service management (ITSM) system for resolving.

4. The method as claimed in claim 1, wherein the capacity data, seasonality data, and the semantic data are obtained from a sematic and contextual knowledge (SCK) database.

5. The method as claimed in claim 1 further comprises updating at least one of the final threshold value, the at least one new filtering rule, optimized event alerts in the SCK database.

6. The method as claimed in claim 1, wherein the probable usage is determined based on at least one of the seasonality data, the semantic and context data, and down-time data associated with the at least one configuration item.

7. The method as claimed in claim 1, wherein the probable usage for the at least one configuration item is determined based on percentage of participation of the at least one configuration item with respect to probable total usage, wherein the probable total usage is determined as summation of the probable usage of each of the at least one configuration items.

8. An alert optimization system for optimizing event alerts in an information technology (IT) infrastructure management system, comprising: a processor; and
    a memory communicatively coupled to the processor, wherein the memory stores processor-executable instructions, which, on execution, causes the processor to perform operations comprising:
        tracking one or more event alerts, triggered by monitoring tools, in the IT infrastructure management system;
        determining a probable usage for at least one configuration item associated with the one or more event alerts based on the tracking;
        determining a probable threshold value for each of the at least one of configuration item based on the probable usage and capacity data;
        creating a mapping of at least one season to each of the at least one configuration item;
        computing a final threshold value for each of the at least one configuration item based on the probable threshold value, seasonality data, the mapping of the at least one season to each of the at least one configuration item, and semantic context data, wherein the final threshold value for each of the at least one configuration item is within a predefined feasibility range for the probable threshold value determined for each of the at least one configuration item, and wherein the predefined feasibility range associated with each of the at least one configuration item is determined based on maximum processing capacity and processing capacity currently utilized by a background program for an associated configuration item from the at least one configuration item;
        determining a time interval based on the number of event alerts generated in the past for the at least one configuration item, wherein the time interval is associated with the final threshold value based on the probable threshold value and the seasonality data; and optimizing the event alerts by filtering at least one unwanted event alert from the one or more event alerts based on the final threshold value and the time interval.

9. The system as claimed in claim 8, wherein operations further comprise:
dynamically ascertaining at least one new filtering rule based on at least one of the final threshold value, seasonality data, or the semantic context data;
adding the at least one new filtering rule to an event correlation engine of the alert optimization system, wherein the event correlation engine comprises predefined filtering rules; and
optimizing, by the event correlation engine, the event alerts by filtering at least one unwanted event alert from a first set of filtered event alerts, based on at least one of the predefined filtering rules and the at least one new filtering rule, wherein the first set of filtered event alerts is obtained upon filtering based on the final threshold value.

10. The system as claimed in claim 8, wherein operations further comprise reporting optimized event alerts to an information technology service management (ITSM) system for resolving.

11. The system as claimed in claim 8, wherein the capacity data, seasonality data, and the semantic data are obtained from a sematic and contextual knowledge (SCK) database.

12. The system as claimed in claim 11, wherein the SCK database is created by natural language processing (NLP) techniques to aggregate events, seasonality data, semantic context data, one or more predefined rules for generating event alerts, and patterns obtained from raw data pertaining to the IT infrastructure management system.

13. The system as claimed in claim 8, wherein operations further comprise updating at least one of the final threshold value, the at least one new filtering rule, optimized event alerts in the SCK database.

14. The system as claimed in claim 8, wherein the probable usage is determined based on at least one of the seasonality data, the semantic and context data, and down-time data associated with the at least one configuration item.

15. A non-transitory computer-readable medium storing instructions for optimizing event alerts in an information technology (IT) infrastructure management system, wherein upon execution of the instructions by one or more processors, the processors perform operations comprising:
tracking one or more event alerts, triggered by monitoring tools, in the IT infrastructure management system;
determining a probable usage for at least one configuration item associated with the one or more event alerts based on the tracking;
determining a probable threshold value for each of the at least one configuration item based on the probable usage and capacity data;
creating a mapping of at least one season to each of the at least one configuration items;
computing a final threshold value for each of the at least one configuration item based on the probable threshold value, seasonality data, the mapping of the at least one season to each of the at least one configuration item, and semantic context data, wherein the final threshold value for each of the at least one configuration item is within a predefined feasibility range for the probable threshold value determined for each of the at least one configuration item, and wherein the predefined feasibility range associated with each of the at least one configuration item is determined based on maximum processing capacity and processing capacity currently utilized by a background program for an associated configuration item from the at least one configuration item;
determining a time interval based on the number of event alerts generated in the past for the at least one configuration item, wherein the time interval is associated with the final threshold value based on the probable threshold value and the seasonality data; and
optimizing the event alerts by filtering at least one unwanted event alert from the one or more event alerts based on the final threshold value and the time interval.

16. The computer-readable medium as claimed in claim 15, wherein operations further comprise:
dynamically ascertaining at least one new filtering rule based on at least one of the final threshold value, seasonality data, or the semantic context data;
adding the at least one new filtering rule to an event correlation engine of the alert optimization system, wherein the event correlation engine comprises predefined filtering rules; and
optimizing, by the event correlation engine, the event alerts by filtering at least one unwanted event alert from a first set of filtered event alerts, based on at least one of the predefined filtering rules and the at least one new filtering rule, wherein the first set of filtered event alerts is obtained upon filtering based on the final threshold value.

17. The computer-readable medium as claimed in claim 15, wherein operations further comprise reporting optimized event alerts to an information technology service management (ITSM) system for resolving.

18. The computer-readable medium as claimed in claim 15, wherein the capacity data, seasonality data, and the semantic data are obtained from a sematic and contextual knowledge (SCK) database.

19. The computer-readable medium as claimed in claim 15, wherein operations further comprise updating at least one of the final threshold value, the at least one new filtering rule, optimized event alerts in the SCK database.

20. The computer-readable medium as claimed in claim 15, wherein the probable usage is determined based on at least one of the seasonality data, the semantic and context data, and down-time data associated with the one or more configuration items.

* * * * *